United States Patent [19]
Ginetti et al.

[11] Patent Number: 5,426,591
[45] Date of Patent: Jun. 20, 1995

[54] APPARATUS AND METHOD FOR IMPROVING THE TIMING PERFORMANCE OF A CIRCUIT

[75] Inventors: Arnold Ginetti, Antibes, France; Mossaddeq Mahmood, San Jose; Balmukund Sharma, Santa Clara, both of Calif.

[73] Assignee: VLSI Technology, Inc., San Jose, Calif.

[21] Appl. No.: 188,292

[22] Filed: Jan. 28, 1994

[51] Int. Cl.⁶ .............................................. G06F 17/50
[52] U.S. Cl. ................................... 364/489; 364/488
[58] Field of Search ............... 364/488, 484, 490, 491, 364/578

[56] References Cited
U.S. PATENT DOCUMENTS

| | | | |
|---|---|---|---|
| 5,197,015 | 3/1993 | Hartoog et al. | 364/490 |
| 5,258,919 | 11/1993 | Yamanouchi et al. | 364/489 |
| 5,282,148 | 1/1994 | Poirot et al. | 364/491 |
| 5,311,443 | 5/1994 | Crain et al. | 364/491 |

*Primary Examiner*—Kevin J. Teska
*Assistant Examiner*—Susan Wieland
*Attorney, Agent, or Firm*—Flehr, Hohbach, Test, Albritton & Herbert

[57] ABSTRACT

A computer aided design system and method for automatically modifying a specified Hardware Description Language (HDL) characterization of a circuit to reduce signal delays on critical paths of the circuit is described. The specified circuit is analyzed with a logic synthesizer including a novel cell-based timing verifier that determines if a circuit meets specified timing requirements. Timing requirements are tested by computing a slack value for each node of the circuit at the component (macrocell) level, where the slack value represents the difference between the required arrival time of a signal at each circuit node and the computed worst case signal arrival time for the node. The output node having the most negative slack value is identified as a critical node. The HDL description of the circuit corresponding to the critical node is modified with a synthesis directive to substitute the original datapath cell with a better cell in order to improve the circuit's timing performance. The revised HDL description of the circuit is then re-synthesized. Improvements to the circuit may be repeated in this fashion until the circuit meets all timing constraints.

10 Claims, 8 Drawing Sheets

APPARATUS AND METHOD FOR IMPROVING THE TIMING PERFORMANCE OF A CIRCUIT

BRIEF DESCRIPTION OF THE INVENTION

This invention relates generally to computer aided design systems for designing integrated circuits. More particularly, this invention relates to a computer aided design system and method for improving the timing performance of selectively identified nodes of an integrated circuit.

BACKGROUND OF THE INVENTION

Application Specific Integrated Circuits (ASICs) are designed using a variety of Computer Aided Design (CAD) tools. The development of ASICs with CAD tools is often referred to as Electronic Design Automation (EDA).

An integrated circuit design can be represented at different levels of abstraction, such as the Register-Transfer level (RTL) and the logic level, using a hardware description language (HDL). VHDL and Verilog are examples of HDL languages. At any abstraction level, an integrated circuit design is specified using behavioral or structural descriptions or a mix of both.

The structural description of an integrated circuit is also referred to as a netlist. A netlist is a list of components and interconnections between the components. A netlist is hierarchical when any component in the netlist is itself a netlist.

At the logical level, the behavioral description is specified using boolean equations. The structural description is represented as a netlist of primitive cells. Examples of primitive cells are full-adders, NAND gates, latches, and D-Flip Flops.

At the RTL level, the behavioral description consists of program-like constructs, such as, variables, operators, conditionals, loops, procedures and functions. The structural description is a netlist of high-level macrocell components, such as adders, pipelined multipliers, ALUs, multiplexors, and register-files. This macrocell is also referred to as a datapath cell. Each macrocell or datapath cell has a corresponding netlist of primitive cells and a corresponding predesigned custom layout. This logic-level netlist of primitive cells, and the custom layout are generated using a silicon compiler tool. The timing and pin capacitance information of this logic-level netlist is required for analyzing the timing of a RTL level netlist.

A silicon compiler accepts as inputs a netlist composed of interconnected macrocells and produces as output a netlist composed of interconnected primitive cells, and a custom layout.

The functional relationships between several commonly used CAD tools is depicted in FIG. 1. One such CAD tool is an RTL Synthesizer 22. An RTL synthesizer 22 accepts as input an RTL description 24 of a design, written in an HDL language, such as VHDL or Verilog, and produces as output a netlist 26. The netlist 26 comprises a list of circuit components and the interconnections between the components. More particularly, the netlist 26 generated by the RTL synthesizer 22 is a hierarchical netlist composed of logic-level netlists (i.e., netlists of primitive cells) and RTL level netlists (i.e., netlists of datapath cells). The primitive cells, such as NAND gates, XOR gates and D-Flip-Flops, are obtained from a cell library 30. The area, timing and pin capacitance information of each primitive cell is also available from the cell library 30. The datapath cells, such as ALUs, adders and register files, are obtained by the RTL synthesizer 22 from a datapath library 38.

Other CAD tools may be used to verify that the circuit described in the netlist meets timing requirements or other constraints. For example, a logic synthesizer/timing analyzer 28 may be used to optimize the netlist for such purposes. When the netlist 26 is composed of logic-level netlists only, a logic synthesizer/timing analyzer 28 may analyze the timing of the netlist 26 using the timing constraints 32 and the timing and pin capacitance information of each primitive cell available from the cell library 30, and finally may produce an optimized netlist 36 with better timing performance than the original netlist 26.

The logic synthesizer/timing analyzer 28 may perform spatial optimization to decrease the area of a circuit defined by the netlist. The logic synthesizer/timing analyzer 28 may also operate to insure that the designed circuit meets a set of timing constraints 32. An integrated circuit may have specified timing constraints that define the maximum permissible time periods between receipt of a particular set of input signals and the generation of output signals on specified output nodes of the circuit. The timing performance of a circuit is a function of the delays through the logic gates of the circuit, wiring capacitances, input connector drive strengths, and output connector loads. The propagation times are computed by a timing analyzer built in the logic synthesizer/timing analyzer 28.

Prior art timing analyzers assess the timing performance of a circuit on the basis of a logic-level analysis. In other words, the timing analyzer determines timing performance by analyzing the primitive cells of the circuit; the timing analyzer does not directly determine the timing performance of the datapath cells (RTL components or macrocells), for which accurate timing information is not available in the datapath library 38. Based upon this logic-level analysis, the logic synthesizer/timing analyzer 28 modifies the logic-level netlist in order to insure that the circuit meets all specified constraints.

In these prior art methods, the circuit's netlist is modified at the logic-level only, but the RTL level netlist, if any, remains the same. Thus, prior art RTL synthesizers do not have accurate timing information for the RTL level netlist. In other words, datapath cell timing information is not available to the RTL synthesizer 22 when it is mapping the HDL description of a circuit to RTL components. Thus, prior art RTL synthesizers are unable to improve the timing performance of the RTL level circuit for a given timing constraint.

Since prior art timing analyzers rely upon logiclevel information, it is difficult to analyze the circuit design at the datapath cell level. Thus, it would be desirable to facilitate the analysis of a netlist composed of RTL and logic-level components. It would also be desirable to provide a method and apparatus for modifying a circuit at the RTL level. Such a capability would allow analyses of area and timing trade-offs that are not available with logic-level modifications. For example, at an RTL level, the architecture of a 64-bit adder can be easily changed from a ripple carry (slow and small) architecture to a carry look-ahead (fast and large) architecture to drastically improve the timing performance of critical paths.

After the logic synthesizer/timing analyzer 28 optimizes the netlist, there are a number of commercially available "silicon compilers", sometimes called "datapath compilers" or "place and route tools" 34, that may then be used to convert the optimized netlist 36 into a semiconductor circuit layout. The semiconductor circuit layout may then be used to manufacture the circuit.

OBJECTS AND SUMMARY OF THE INVENTION

It is a general object of the present invention to provide an apparatus and method for improving the timing performance of a circuit described in the form of a netlist.

It is another object of the invention to analyze the timing performance of a circuit described in the form of a netlist, and improve the timing performance of the circuit by substituting selected datapath cells in the netlist.

These and other objects are achieved by a computer aided design system and method for automatically modifying a specified Hardware Description Language (HDL) characterization of a circuit so as to reduce signal delays on critical paths of the circuit. The specified circuit is analyzed with a logic synthesizer including a novel cell-based timing verifier that determines if a circuit meets specified timing requirements. Timing requirements are first tested for each node of the circuit at the primitive cell (logic) level, and then automatically reported at the datapath cell (also called macrocell or RTL component) level. That is, the total timing information for a set of primitive cells forming a datapath cell (macrocell, or an RTL component) is used in the timing analysis. Slack values are computed for each node. The slack value represents the difference between the required arrival time of a signal at each circuit node and the computed worst case signal arrival time for the node. The output node having the most negative slack value is identified as a critical node. The HDL description of the circuit corresponding to the critical node is modified with a synthesis directive that directs the RTL synthesizer to substitute a datapath cell with another datapath cell which improves the timing performance of the previously synthesized circuit. The revised HDL description of the circuit is then resynthesized. Improvements to the circuit may be repeated in this fashion until the circuit meets all timing constraints.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
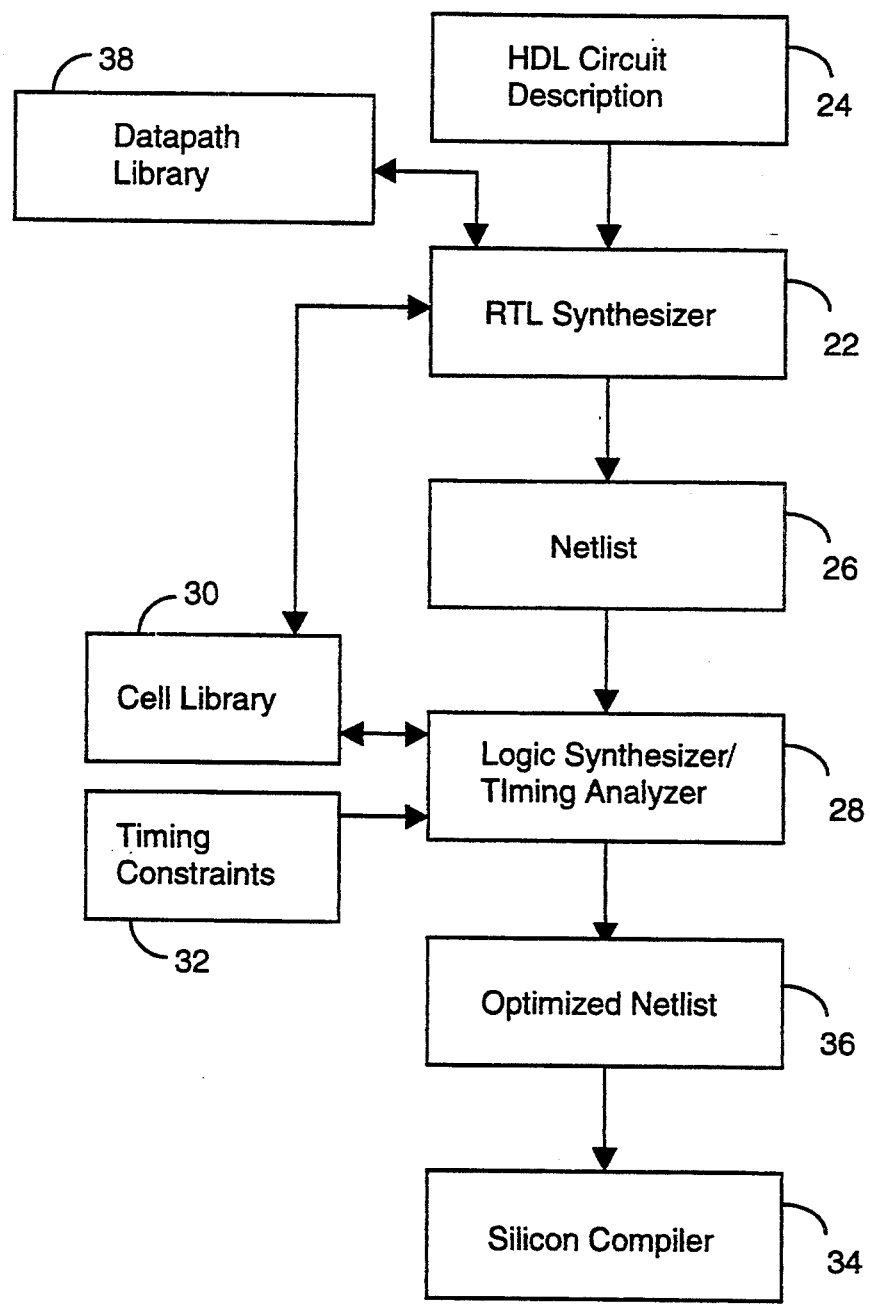
FIG. 1 depicts the processing steps associated with prior art electronic design automation techniques that use a logic-level timing verifier.
Figure 2:
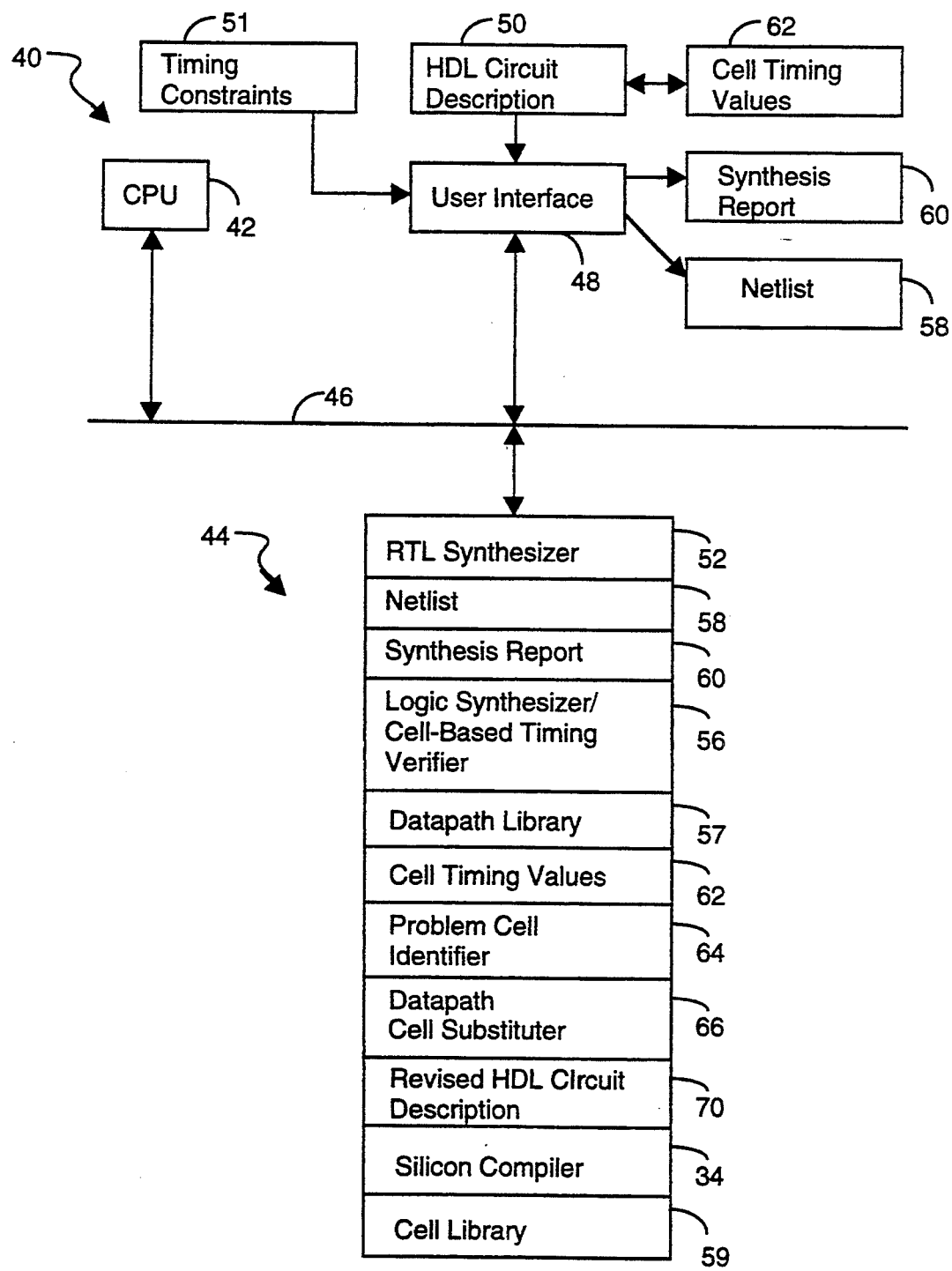
FIG. 2 depicts an apparatus that may be used in accordance with the present invention.

FIG. 2 depicts an apparatus that may be used to execute the method of the present invention. The apparatus 40 includes a central processing unit (CPU) 42 that communicates with a memory module 44 over a bus 46. The CPU 42, memory module 44, and bus 46 are standard computing elements widely known in the art. The memory module 44 may be RAM, ROM, or disc memory. As will be described below, the memory module 44 stores coded programs for executing the method of the present invention. The apparatus 40 also includes a user interface 48 that may include any type of input device, such as a keyboard or monitor; the user interface 48 may also include any type of output device, such as a computer monitor or printer.

An HDL description 50 of a circuit to be designed is entered into the apparatus 40 through the user interface 48. Timing constraints 51 for the circuit are also entered into the apparatus 40 through the user interface 48. As will be more fully described below, the HDL circuit description 50 is processed by a RTL synthesizer 52 that uses a datapath library 57 and a cell library 59 to generate a netlist 58 and a synthesis report 60. As depicted in the figure, the synthesis report 60 and netlist 58 may be accessed through the user interface 48.

The netlist 58 is processed by a cell-based timing verifier of the logic synthesizer/cell-based timing verifier 56. As will be described herein, the cell-based timing verifier 56 analyzes the circuit at the datapath cell (also called macrocell or RTL component) level and automatically reports the timing at the datapath cell level. The cell-based timing verifier then generates cell timing values 62. The cell timing values 62 are processed in accordance with the invention (they may also be accessed by an engineer through the user interface 48). Specifically, a problem cell identifier 64 analyzes the datapath cell timing values 62. Based upon this analysis, a datapath cell substituter 66 modifies the HDL circuit description 70. As will be described below, the HDL circuit description 70 may be re-synthesized and re-coded until all circuit constraints are met. When the circuit meets all constraints, it is conveyed to a silicon compiler 34 for routing and placement, in accordance with prior art techniques.

Figure 3:
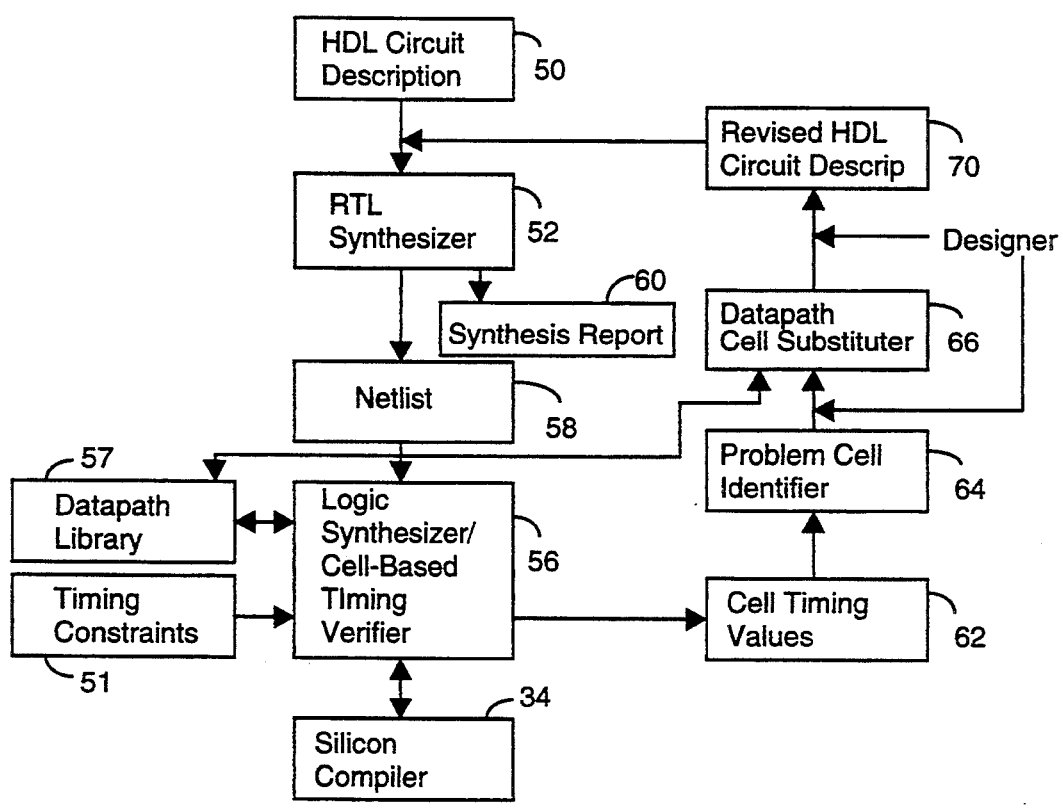
FIG. 3 depicts the processing associated with designing a circuit in accordance with the present invention.

FIG. 2 provides a depiction of the apparatus used in accordance with the invention. The discussion corresponding to FIG. 2 provides an overview of the operation of the invention. FIG. 3 provides a more detailed representation of the process of the invention, as executed on the apparatus of FIG. 2. As identified in FIG. 3, an HDL description of a circuit 50 is conveyed to an RTL synthesizer 52. The following computer code is an example of an HDL description for a segment of a circuit:

```
entity design1 is                                    (1)
    port (clk       :in bit;                         (2)
        xi,yi,zi    :in bit_vector(3 downto 0);      (3)
        rst         :in bit;                         (4)
        ou1,ou2     :out bit_vector(3 downto 0));    (5)
end design1;                                         (6)
architecture behavior of design1 is
    -- compass maxdelay 10                           (7)
signal x,y: bit_vector(3 downto 0);                  (8)
begin                                                (9)
    ou1 <= x;                                        (10)
    ou2 <= y;                                        (11)
    process                                          (12)
        variable temp: bit_vector(3 downto 0);       (13)
    begin                                            (14)
        wait until clk'event and clk = '1';          (15)
        if rst = '0' then                            (16)
            temp:= xi + yi;                          (17)
            x <= temp + zi;                          (18)
            y <= xi - yi;                            (19)
        else                                         (20)
            temp:= xi - yi;                          (21)
            x <= temp - zi;                          (22)
            y <= xi + yi;                            (23)
        end if;                                      (24)
    end process                                      (25)
end behavior                                         (26)
```

The first line of code introduces the parameters for a circuit entity ("Design1"). Lines (2) through (5) define the input and output ports for the architecture. Specifically, there are two one-bit input ports ("clk" and "rst"), three four-bit input ports ("xi" , "yi" ""zi" and two four-bit output ports ("ou1" "ou2" )

The seventh line of code introduces the circuit architecture "behavior" for entity "design1". Note that the double-dash ( "--" ) is generally used to isolate documentation explaining the code. In this instance, the double-dash is followed by a special character string ("Compass") that informs the RTL synthesizer 52 that the information that follows must be considered by the RTL synthesizer 52 and the logic synthesizer 54 during performance optimization. Specifically, a maximum delay for the circuit ("maxdelay") is defined at 10 nanoseconds.

Intermediate signal values ("x","y") are defined at line (8). The processing loop begins at line (9). The output signals ("ou1", "ou2") are respectively defined in relation to the intermediate signal values ("x","y"). A variable ("temp") is defined at line (13). Line (15) defines a condition that will initiate processing of the input signals. Specifically, there must be a clock event ( "clk'event") and the clock signal must be high ( "clk='1'"). In other words, there must be a clock signal transition from a low to a high state.

Line (16) defines a logic condition. If the input bit reset is zero ("rst='0'"), then the logic at lines (17) through (19) is executed (temp:=xi+yi; x<=temp+zi; y<=xi-yi). Otherwise, the logic of lines (21) through (22) is executed (temp:=xi-yi; x <=temp-zi; y<=xi+yi). Then by executing lines (10) and (11), the values of "ou1" and "ou2" are assigned the values of "x" and "y", respectively. Lines (24) through (26) close loops and de-mark the end of the RTL behavioral description of the circuit.

The foregoing code provides an example of a portion of a circuit and how that circuit portion is characterized in a Hardware Description Language (HDL). An RTL synthesizer 52 may now be used to synthesize the HDL circuit description 50. RTL synthesizers 52 are known in the art. RTL synthesizers convert an HDL description of a circuit into a netlist 58. A netlist 58 is a list of circuit components and the interconnections between those components. Thus, an RTL synthesizer 52 accesses a datapath library 57 to identify circuit components that can perform the logic specified in the HDL circuit description. These components, and the connections between them, are then embodied in a netlist 58.

The RTL synthesizer 52 of the present invention provides an additional feature: a synthesis report 60. The synthesis report 60 describes the circuit elements selected to execute the HDL circuit 50, the size of the circuit elements, the total propagation time for the resultant circuit, and other parameters. An exemplary synthesis report 60 corresponding to the previous HDL circuit description is as follows:

```
DATAPATH NAME: design1_dp1                           (1)
DATAPATH WIDTH: 4                                    (2)
AREA SUMMARY:                                        (3)
                                                     (4)
               Num     Width    Total
    Cell Name  Insts   Per Cell Width                (5)
    VDP5ASB002   3       113     339                 (6)
    VDP3DFF001   2        51     102                 (7)
DATAPATH HEIGHT: 113                                 (8)
RESOURCE ALLOCATION REPORT:                          (9)
    INSTANCE: ASB51, ELEMENT: VDP5ASB002             (10)
    Ops implemented: 2                               (11)
    Op: 1, context:                                  (12)
    design1: x <= temp + zi;                         (13)
    Op: 2, context:                                  (14)
    design1: x <=temp - zi;                          (15)
    INSTANCE: ASB53, ELEMENT: VDP5ASB002             (16)
    Ops implemented: 2                               (17)
    Op: 1, Context:                                  (18)
    design1: temp = xi - yi;                         (19)
    Op: 2, Context:                                  (20)
    design1: temp = xi + yi;                         (21)
    INSTANCE: ASB54, ELEMENT: VDP5ASB002             (22)
    Ops implemented: 2                               (23)
    Op: 1, Context:                                  (24)
    design1: y <= xi + yi;                           (25)
    Op: 2, Context:                                  (26)
    design1   x <= xi - yi;                          (27)
    Final Estimated Time 22.6 ns                     (28)
```

The first line of the report identifies the datapath of the circuit as "design1_dp1". The second line of the code indicates that the datapath width is "4", corresponding to the input and output signals that are four bits wide. Line 3 introduces a summary of the physical area occupied by the circuit. Lines 6 and 7 identify the components that are used in the circuit and area information related to the components. For example in line 6, the component "VDP5ASB002" is used 3 times, as indicated by the heading that identifies the number of instances ("Num Insts"). The width of each component is 113 microns and the total width is 339 microns.

Line 9 introduces a description of the allocation of resources within the circuit. Line 10 indicates that one component in the circuit is an addition/subtraction component. The component is referred to as an instance ("INSTANCE ASB51"), of an element ("ELEMENT VDP5ASB002"). The "element" is obtained from the datapath library 57, and is identified as "ELEMENT VDP5ASB002". The foregoing HDL circuit description is merely a portion of a larger circuit. In the large circuit (only a portion of which is described here), there are many instances of other circuit elements not listed in the above abbreviated synthesis report.

The datapath library 57 maintains complete information on every component in the library, component information will include component logic, the number of gates, the height, the width, the power consumption, the area, the pin description, etc. The functional operation performed by the component is identified in the synthesis report. For example line 11 states that the component implements two operations. The two operations are identified at line 13 ("x< =temp+zi") and at line 15 ("x< =temp−zi").

The remaining lines of the synthesis report follow the same pattern. The last line of the report provides an estimate of the signal propagation time through the circuit.

Figure 4:
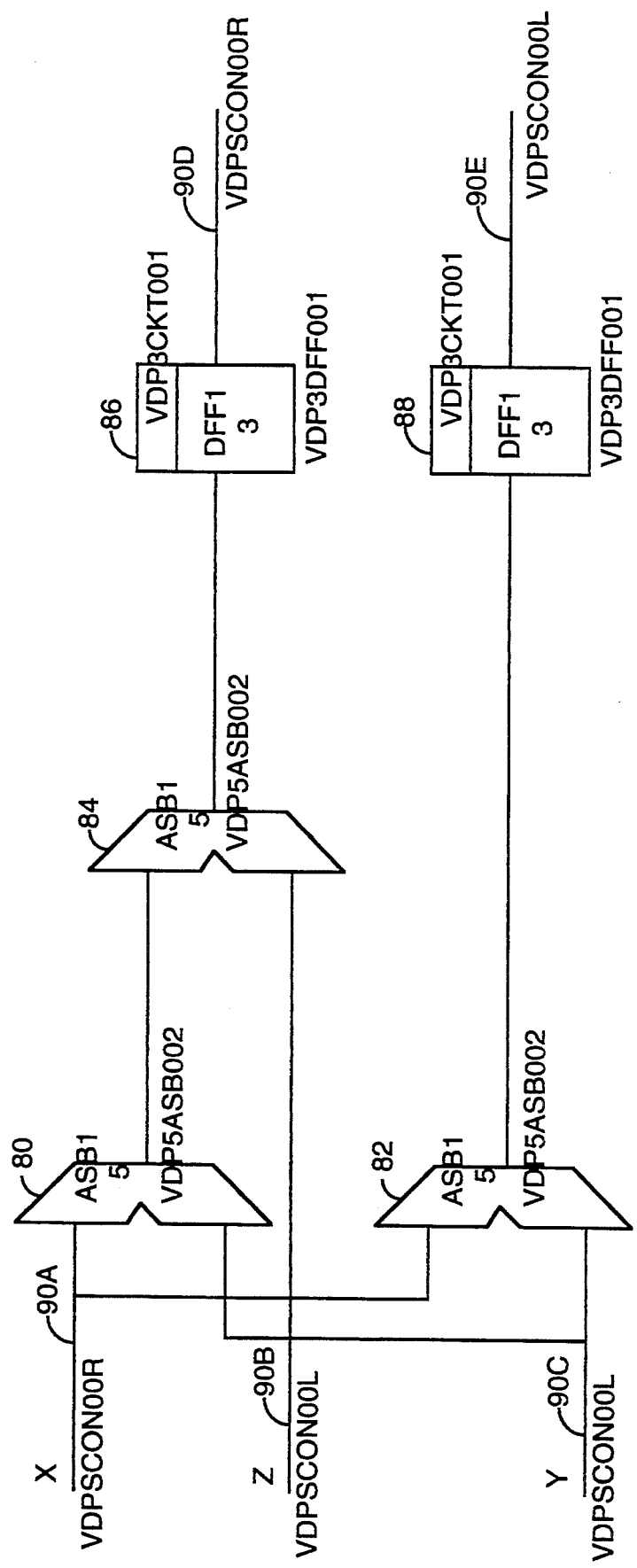
FIG. 4 is a schematic of a circuit designed in accordance with the invention wherein the circuit components are identified by datapath cell names.
Figure 5:
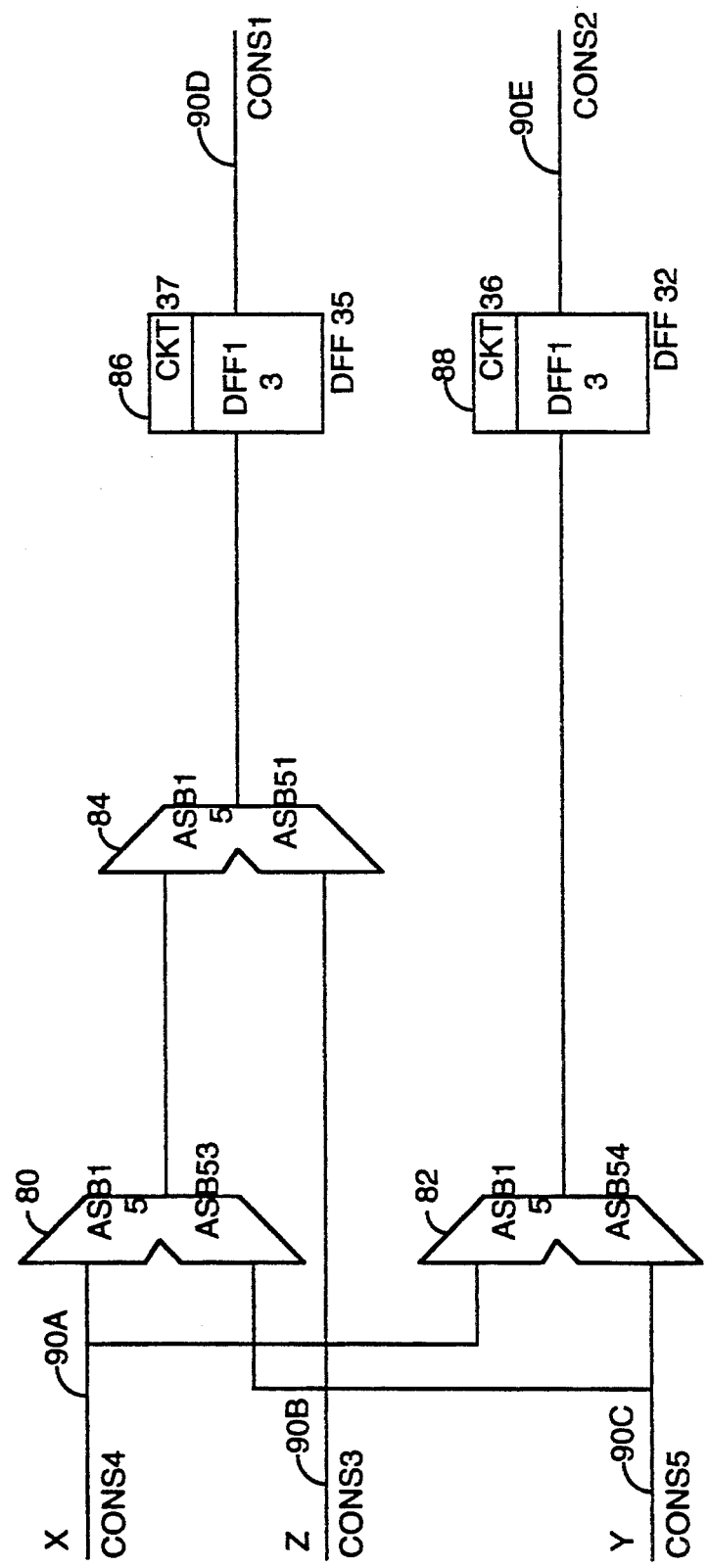
FIG. 5 is a schematic of a circuit designed in accordance with the invention wherein the circuit components are identified by instance names.

An example of a segment of an HDL circuit 50 has been provided. An example of a synthesis report 60 corresponding to the HDL circuit 50 has also been provided. FIGS. 4 and 5 depict schematics corresponding to the HDL circuit 50 and the synthesis report 60.

FIG. 4 identifies the different circuit components by their "cell", "element", or "component" names. Thus, addition/subtraction unit 80 is identified as "VDP5ASB002", its "element" or "cell" name in the datapath library 57. Addition/subtraction elements 82, 84 have the same names. FIG. 4 also includes two D-type flip-flops 86, 88. Each flip-flop is identified as "cell" or "element" "VDP3DFF001". Recall that line 7 of the synthesis report identified these elements. FIG. 4 also includes a variety of connectors 90 to link the different circuit elements. Each connector 90 is identified through its name; for example, connector 90A is identified through name "VDPSCON00R".

FIG. 5 corresponds to FIG. 4, but instead of identifying the circuit components by "cell" or "element" names, the schematic identifies the circuit components by their "instance" names. Thus, addition/subtraction unit 80 is identified as "ASB53", connector 90A is identified as "CONS4", flip-flop 86 is identified as "DFF35", etc.

Returning to FIG. 3, the netlist 58 is conveyed to a logic synthesizer/cell-based timing verifier 56. As previously stated, the netlist 58 includes a complete description of the circuit components and their interconnections. In contrast, the synthesis report 60 includes only the circuit components.

Timing constraints 51 are provided to the cell-based timing verifier of the logic synthesizer/cell-based timing verifier 56. The timing constraints 51 simply define time propagation limits for the signals in the circuit.

Instead of determining propagation delays at the gate level, the cell-based timing verifier of the invention utilizes the timing information associated with each datapath cell component. Thus, for example, turning to FIG. 4, the cell-based timing verifier would sum the propagation delays associated with the datapath cells in each path of the circuit. One such path in FIG. 4 includes the connector 90A ("VDPSCON00R"), adder-subtractor 80 ("VDP5ASB002"), addition-subtractor 84 ("VDP5ASB002"), flip-flop 86 ("VDP3DFF001") and connector 90D ("VDPSCON00R"). Prior art timing analyzers sum the values for all the gates in the path.

The timing information is derived from the inherent characteristics of the components in the signal path and by the nature of the interconnections between the components in the signal path. The inherent characteristics of the components are available from the datapath library 57. The interconnections between the components are defined by the netlist. Specifically, the following criteria may be used to derive timing information. The delay values for a circuit node may be defined as a pair of a Rising_delay and a Falling_delay where: Rising_delay=propRise+(rampRise*capacitive_load) and Falling_delay=propFall+(rampFall*capacitive_load). The capacitive load for a circuit node (or, equivalently, for a component's output pin) is the output capacitance of that pin plus the input capacitance of all pins connected to it. The "propRise" value is the time it takes for a signal to propagate through a component and arrive at a valid HIGH level. The "rampRise" value defines the rate at which a HIGH signal rises in a component. The "propFall" value is the time it takes for a signal to propagate through a component and arrive at a valid LOW level. The "rampFall" value is the rate at which a LOW signal falls in a component. The capacitive parameters depend upon interconnections while the remaining parameters are contingent upon the component's inherent characteristics, as set forth in the datapath library 57. The computed delay factor may be refined by adding a setup-and-hold value representing the time that a stable value must be held by the component.

The foregoing considerations for establishing a delay value for a gate of a circuit are known in the art. The utilization of these factors in the present invention to define delay values for datapath circuit components and then relying upon the datapath circuit delay values to make design decisions is believed to be novel.

Figure 6:
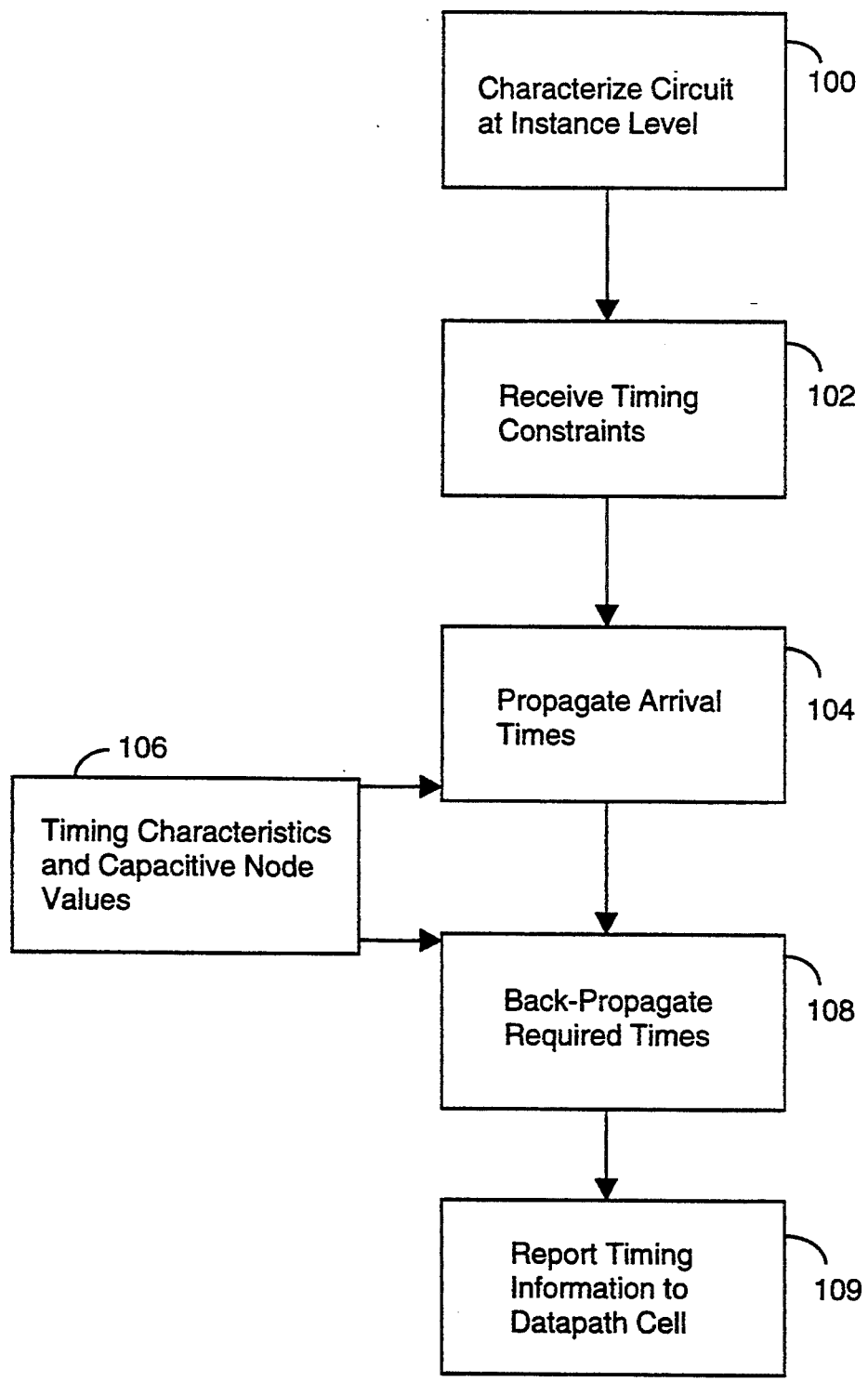
FIG. 6 depicts the processing steps associated with a cell-based timing verifier in accordance with the present invention.

FIG. 6 describes the processing associated with the cell-based timing verifier 56 of the invention. The first step associated with the timing verifier is to characterize the circuit at the instance level (block 100). This is done by invoking the silicon compiler 34 to generate the logic-level description from the datapath cells (also called macrocells and RTL components) instantiated in the RTL netlist synthesized by the RTL synthesizer 52. For example, FIG. 5 describes the circuit at the instance level. Note that prior art timing verifiers characterize the circuit at the gate level, and not at the datapath cell level.

The next processing step associated with the timing verifier 56 is to receive timing constraints (block 102). The timing constraints establish when certain signals in the circuit must be present at given locations within the circuit. The next processing step is to propagate input arrival times for each component within the circuit (block 104). The arrival times are established by timing characteristics and capacitive node values (block 106), as described above. The next processing step associated with the timing verifier of the invention is to back-propagate required output times for each component within the circuit (block 108). The difference between the arrival time and the required time is the slack value. The arrival time plus the output delay time represents the total time required to propagate a signal to and through a given circuit component. The final step is to report the timing information from the primitive cell (also called logic) level to the datapath cell (also called macrocell or RTL component) level (block 109). In other words, all gate level timing information for a given datapath cell is collected by the timing verifier 56 to yield a total delay time value for the given datapath cell.

The cell-based timing verifier yields a list of cell timing values 62. An exemplary list of cell timing values follows:

| | | | | |
|---|---|---|---|---|
| Instance CONS1 of cell VDPSCON00R | | | | (1) |
| Connector | Arrival Time | Required Time | Slack | (2) |
| i | 2.86 | 8.67 | 5.81 | (3) |
| Instance CONS2 of cell VDPSCON00L | | | | (4) |
| Connector | Arrival Time | Required Time | Slack | (5) |
| i | 2.86 | 8.67 | 5.81 | (6) |
| Instance CONS3 of cell VDPSCON00L | | | | (7) |
| Connector | Arrival Time | Required Time | Slack | (8) |
| i | −1.08 | −.47 | .62 | (9) |
| Instance CONS4 of cell VDPSCON00R | | | | (10) |
| Connector | Arrival Time | Required Time | Slack | (11) |
| i | −.78 | −4.94 | 4.16 | (12) |
| Instance CONS5 of cell VDPSCON00L | | | | (13) |
| Connector | Arrival Time | Required Time | Slack | (14) |
| i | −.93 | −7.08 | −6.14 | (15) |
| Instance ASB51 of cell VDP5ASB002 | | | | (16) |
| Connector | Arrival Time | Required Time | Slack | (17) |
| a | 11.57 | 1.67 | −9.91 | (18) |
| b | −1.08 | −.47 | .62 | (19) |
| so | 18.13 | 8.67 | −9.45 | (20) |
| Instance DFF32 of cell VDP3DFF001 | | | | (21) |
| Connector | Arrival Time | Required Time | Slack | (22) |
| clockspec | | | | (23) |
| d | 12.47 | 8.67 | −3.79 | (24) |
| q | 2.86 | 8.67 | 5.81 | (25) |
| Instance ASB53 of cell VDP5ASB002 | | | | (26) |
| Connector | Arrival Time | Required Time | Slack | (27) |
| a | −.78 | −4.94 | −4.16 | (28) |
| b | −.93 | −7.08 | −6.14 | (29) |
| so | 11.57 | 1.67 | −9.91 | (30) |
| Instance ASB54 of cell VDP5ASB002 | | | | (31) |
| Connector | Arrival Time | Required Time | Slack | (32) |
| a | −.78 | −4.94 | −4.16 | (33) |
| b | −.93 | −7.08 | −6.14 | (34) |
| so | 12.47 | 8.67 | −3.79 | (35) |
| Instance DFF35 of cell VDP3DFF001 | | | | (36) |
| Connector | Arrival Time | Required Time | Slack | (37) |
| clockspec | | | | (38) |
| d | 18.13 | 8.67 | −9.45 | (39) |
| q | 2.86 | 8.67 | 5.81 | (40) |

The foregoing cell timing values 62 include a description of each element of the circuit of FIG. 4 (and 5). For example, the first line of the cell timing values identifies the connector 90D. The second line includes a field "Required Time", which describes the time at which a signal is required at a specified cell.

The timing constraints 51 establish the "Required Time". The arrival time is indicated by the field "arrival time". The field "slack" describes the difference between the required arrival time and the computed arrival time for each cell instance. The "slack" field identifies problem areas in a circuit. Namely, the "slack" field with a negative value identifies the location at which the most detrimental signal delay is occurring. Line 3 of the foregoing cell timing values provides data for the instance defined in line 1. The timing information for connector 90E is defined at lines 4 through 6. The remaining connectors are defined at lines 7 through 15.

Line 16 defines the addition/subtraction unit 84 ("Instance ASB51 of cell VDP5ASB002"). Slack values are provided for both inputs to the element ("a" and "b") and also for the output of the element ("so"). Line 21 defines the flip-flop 88, while lines 22–25 define the parameters associated with the flip-flop 88. The remaining lines of the cell timing values characterize the other elements of the circuit in a similar fashion.

Returning to FIG. 3, the next step associated with the invention is to identify problem areas (block 66) within the circuit by studying the cell timing values, in particular the slack values. This operation is performed by a problem cell identifier 66. The problem cell identifier 66 may include a procedure that compares all of the slack values and identifies the largest individual negative slack value for a component. In the prior art, such an operation would not be feasible because timing information was not provided at the datapath (macrocell or RTL) component level. Instead, the timing information was provided for an entire circuit, based upon information derived from all of the gates forming the circuit.

The present invention utilizes timing information associated with high-level components of a datapath design. The higher-level timing information allows programmed criteria to change the datapath architecture. For instance, in the foregoing example it can be observed that the largest negative slack values are associated with addition/subtraction element 80 ("Instance ASB53 of cell VDP5ASB002"). An appropriate program can be used to identify the cell with the largest negative slack value.

The next step associated with the invention is to substitute datapath cells to obtain faster circuit performance. For example, the slower addition/subtraction unit 84 may be substituted by a faster datapath cell element which is available in the datapath library 57. A cell substituter 66 may be used to identify the logical operation of the addition/subtraction unit 84. The cell substituter 66 may then compare the logical operation with the resources in the datapath library 57 to determine which cell in the library could be used to enhance the time performance of the circuit. Scrutiny of the datapath library 57 of the present example would reveal that the element "VDP1ASB001" is faster than the element "VDP5ASB002". Thus, this faster element is substituted for its slower counterpart. The cell substituter 66 is implemented with appropriate computer code that compares logical operations and times values to identify an appropriate substitute element.

Substitution of cells results in a revised HDL circuit description (block 70). One technique for implementing the substitution of cells is to provide directives in the original HDL circuit description, an example of this technique follows:

```
entity design1 is                                           (1)
    port (clk       :in bit;                                (2)
          xi,yi,zi  :in bit_vector(3 downto 0);             (3)
          rst       :in bit;                                (4)
          ou1,ou2   :out bit_vector(3 downto 0));           (5)
end design1;                                                (6)
architecture behavior of design1 is
    -- compass maxdelay 10                                  (7)
signal x,y: bit_vector(3 downto 0);                         (8)
begin                                                       (9)
ou1 <= x;                                                  (10)
ou2 <= Y;                                                  (11)
process                                                    (12)
    variable temp: bit_vector(3 downto 0);                 (13)
begin                                                      (14)
    wait until clk'event and clk = '1';                    (15)
    if rst = '0' then                                      (16)
        temp:= xi + yi;--compass dp_cell VDP1ASB001        (17)
        x <= temp + zi;                                    (18)
        y <= xi − yi;                                      (19)
    else                                                   (20)
        temp:= xi − yi;--compass dp_cell VDP1ASB001        (21)
        x <= temp − - zi;                                  (22)
        y <= xi + yi;                                      (23)
    end if;                                                (24)
    end process                                            (25)
end behavior                                               (26)
```

Note that at line (17) a specific directive is created to establish the cell element ("dp_cell VDP1ASB001") that is to be used to execute the given logical operation ("temp:=xi+yi). Similarly, a directive is provided at line (21).

In other embodiments of the present invention, the directive may use any predefined syntax recognized by the RTL synthesizer being used. The important feature is that a specific cell from the cell library is identified, prior to RTL synthesis, to execute a given HDL operation.

Regardless of the technique used to revise the HDL circuit description, the revised HDL circuit description is re-conveyed to the logic synthesizer 56. At this time, a new synthesis report 60 would result. The following represents a synthesis report consistent with the foregoing example:

```
DATAPATH NAME: design1_dp1                              (1)
DATAPATH WIDTH: 4                                       (2)
AREA SUMMARY:                                           (3)
            Num    Width     Total                      (4)
Cell Name   Insts  Per Cell  Width                      (5)
VDP5ASB002  3      113       339                        (6)
VDP3DFF001  2      51        102                        (7)
VDP1ASB001  1      292       292                        (8)
DATAPATH HEIGHT: 292                                    (9)
RESOURCE ALLOCATION REPORT:                             (10)
    INSTANCE: ASB51, ELEMENT: VDP5ASB002                (11)
    Ops implemented: 2                                  (12)
    Op: 1, context:                                     (13)
    design1: x <= temp + zi;                            (14)
    Op: 2, context:                                     (15)
    design1: x <= temp - zi;                            (16)
    INSTANCE: ASB13, ELEMENT: VDP1ASB001                (17)
    Ops implemented: 2                                  (18)
    Op: 1, Context:                                     (19)
    design1: temp:= xi - yi;--compass dp_cell VDPLASB001 (20)
    Op: 2, Context:                                     (21)
    design1: temp:= xi + yi;--compass dp_cell VDPLASB00L (22)
    INSTANCE: ASB54, ELEMENT: VDP5ASB002                (23)
    Ops implemented: 2                                  (24)
    Op: 1, Context:                                     (25)
    design1: y <= xi + yi;                              (26)
    Op: 2, Context:                                     (27)
    design1  x <= xi - yi;                              (28)
    Final Estimated Time 20.4 ns                        (29)
```

Figure 7:
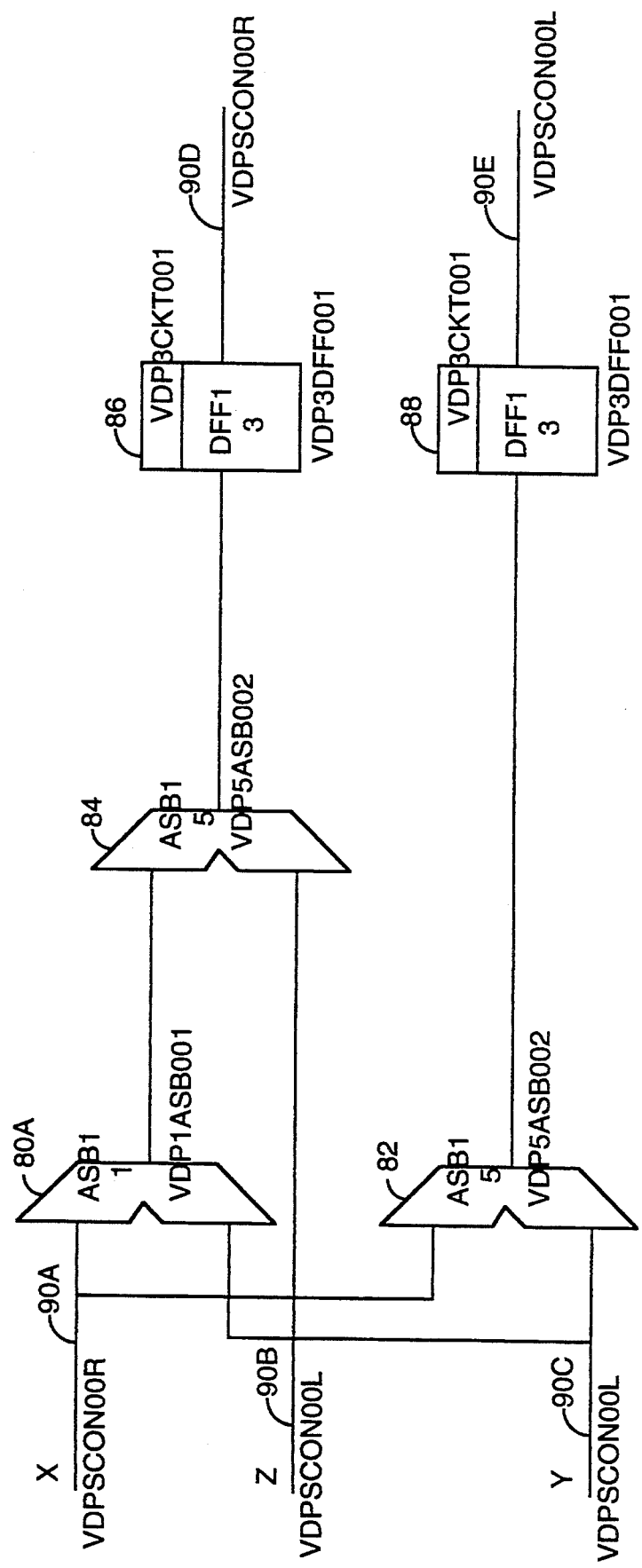
FIG. 7 depicts a schematic of the circuit of FIG. 4, but with an RTL circuit component that has been substituted into the circuit in accordance with the techniques of the invention.
Figure 8:
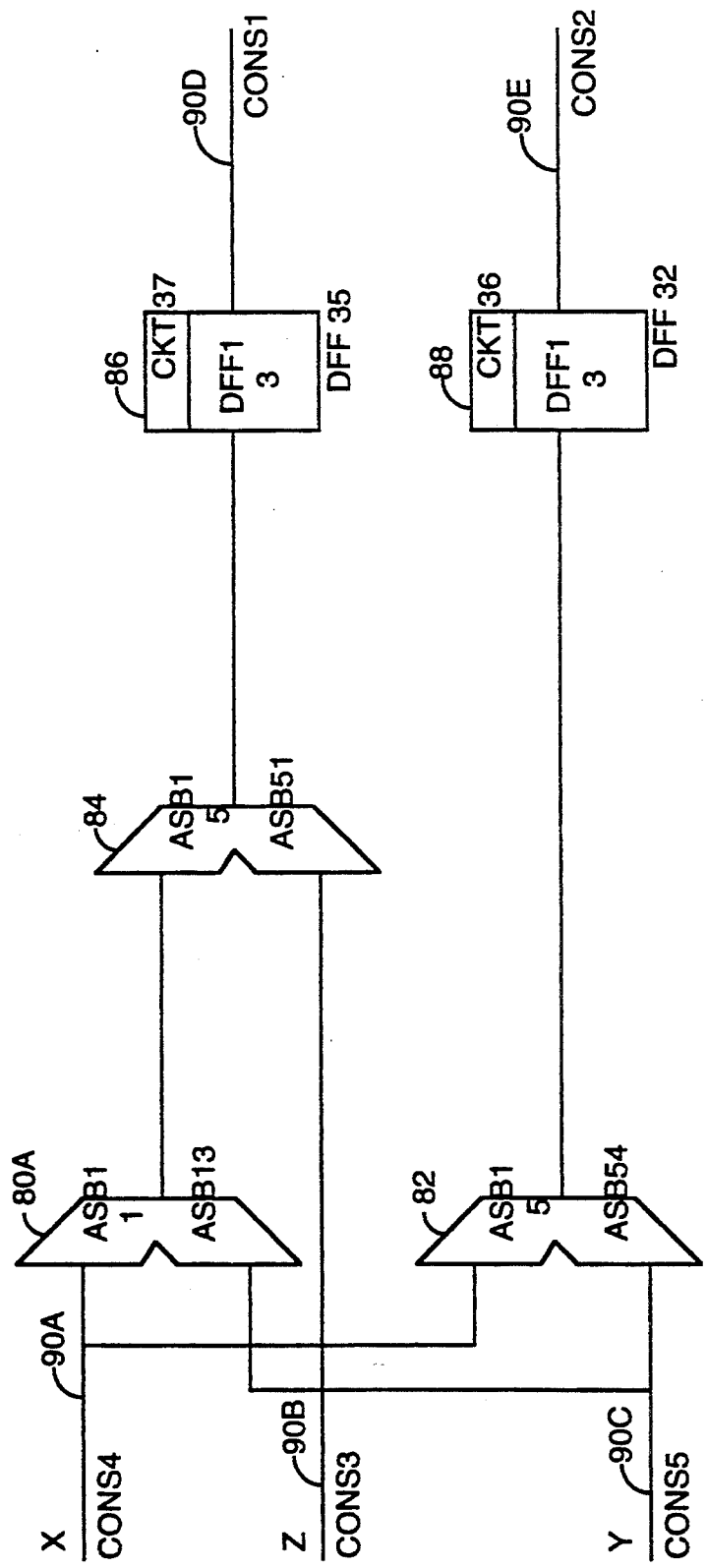
FIG. 8 depicts a schematic of the circuit of FIG. 5, but with an RTL circuit component that has been substituted into the circuit in accordance with the techniques of the invention.

Note that the area summary of the revised synthesis report includes a new datapath cell. Specifically, line 8 includes a reference to cell "VDP1ASB001". This same datapath cell is identified in a directive at lines 20 and 22 of the synthesis report. Line 29 indicates that the revised circuit now has a final estimated time of 20.4 ns, in contrast to the original estimation time of 22.6 ns. The circuit schematics corresponding to these changes are provided in FIGS. 7 and 8. In FIG. 7, it can be seen that addition/subtraction unit 80A is now cell element "VDP1ASB001". FIG. 8 indicates that addition-subtraction unit 80A by its instance number ("ASB13").

The steps described in relation to FIG. 3 may be repeated until all time constraints are satisfied. Afterwards, the netlist 58 is fed to a silicon compiler (place and route tool) 34 for placement and routing of the circuit, in accordance with prior art techniques.

AS shown in FIG. 3, a designer may modify the output from the problem cell identifier 64 and the datapath cell substituter 66. That is, a designer may select which cells to substitute and place an appropriate directive into the HDL circuit description.

It should be noted that techniques other than the ones described herein may be used to select cell substitutions. For instance, the datapath cell substituter 66 may consider all possible datapath cell substitutions along each critical path in the specified circuit and then select a datapath cell substitution that minimizes a predefined cost function. For instance, replacing a datapath cell early in a critical path with a faster datapath cell may resolve many timing problems further down the critical path, thereby reducing the number of datapath cell substitutions needed and also minimizing the resulting increase in the circuit's layout area. Alternatively, on each iteration of the cell substitution process, the datapath cell substituter might look for the datapath cell substitution that produces the largest circuit speed up for the least amount of circuit layout area increase. Another technique the datapath cell substituter 66 can utilize to increase circuit speed is to remove resource sharing along critical paths.

One skilled in the art will recognize that the techniques of the invention may be used to optimize parameters other than speed. For instance, substitute cells may be identified for the purposes of reducing power consumption, circuit area, the number of gates, etc. For example, circuit area may be reduced by selecting small area elements along non-critical paths.

The foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

We claim:

1. An apparatus for designing a circuit, said apparatus comprising:

a Hardware Description Language Register-Transfer Level synthesizer for synthesizing a hardware description language characterization of a circuit into an instance-level circuit including a plurality of interconnected multiple gate components;

a cell-based timing verifier to test the timing performance of said instance-level circuit, said cell-based timing verifier relying upon an instance level timing analysis of said instance-level circuit; and means for replacing at least one of said plurality of interconnected multiple gate components with a new multiple gate component to improve the timing performance of said instance-level circuit.

2. The apparatus of claim 1 wherein said cell-based timing verifier utilizes accumulated real wiring capacitance values of primitive cells to test the timing performance of said instance-level circuit.

3. The apparatus of claim 2 wherein said cell-based timing verifier includes:

means for propagating signal arrival times at each of said plurality of interconnected multiple gate components; and means for back-propagating required signal arrival times at each of said plurality of interconnected multiple gate components.

4. The apparatus of claim 1 wherein said cell-based timing verifier generates a set of cell timing values, said cell timing values including a plurality of slack values, each of said slack values representing the difference between a required arrival time of a signal and a computed worst case signal arrival time for one of said plurality of interconnected multiple gate components.

5. The apparatus of claim 4 wherein said replacing means selects said new multiple gate component based upon said slack values.

6. The apparatus of claim 1 wherein said Register-Transfer Level synthesizer generates a synthesis report describing circuit components utilized in said instance-level circuit and summarizing physical characteristics of said instance-level circuit.

7. A method of designing a circuit, said method comprising the steps of:

synthesizing a hardware description language characterization of a circuit into an instance-level circuit including a plurality of interconnected multiple gate components;

executing an instance level timing analysis of said instance-level circuit to generate a set of cell time values; and replacing at least one of said plurality of interconnected multiple gate components with a new multiple gate component to improve the timing performance of said instance-level circuit, said replacing step relying upon said set of cell timing values.

8. The method of claim 7 wherein said executing step includes the steps of:

propagating signal arrival times at each of said plurality of interconnected multiple gate components; and back-propagating required signal arrival times at each of said plurality of interconnected multiple gate components.

9. The method of claim 7 wherein said executing step results in the generation of a set of cell timing values.

10. The method of claim 7 wherein said replacing step includes the step of placing a directive in said hardware description language characterization of said circuit, said directive specifying a multiple gate component to execute a specified hardware description language operation.

* * * * *